Dec. 30, 1924.
J. J. THACHER
WORK SUPPORT
Filed March 21, 1922
1,521,341
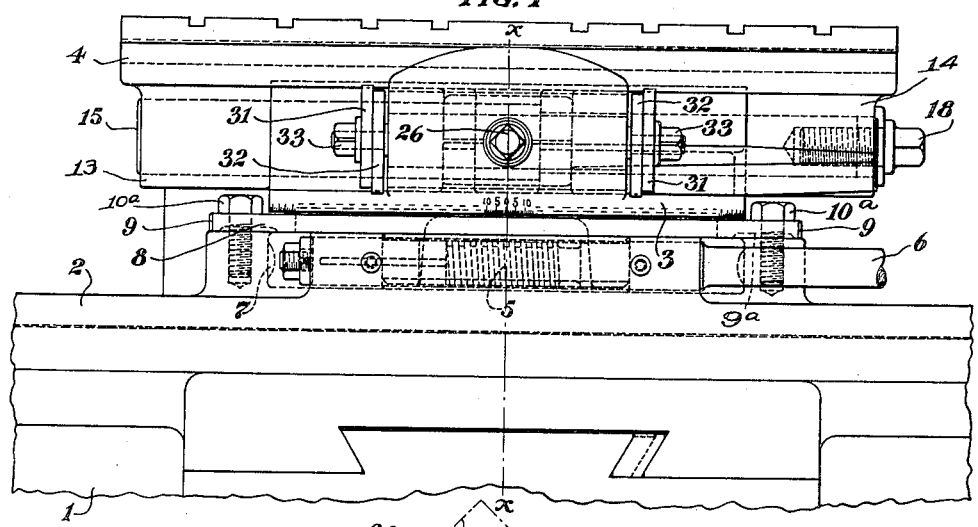
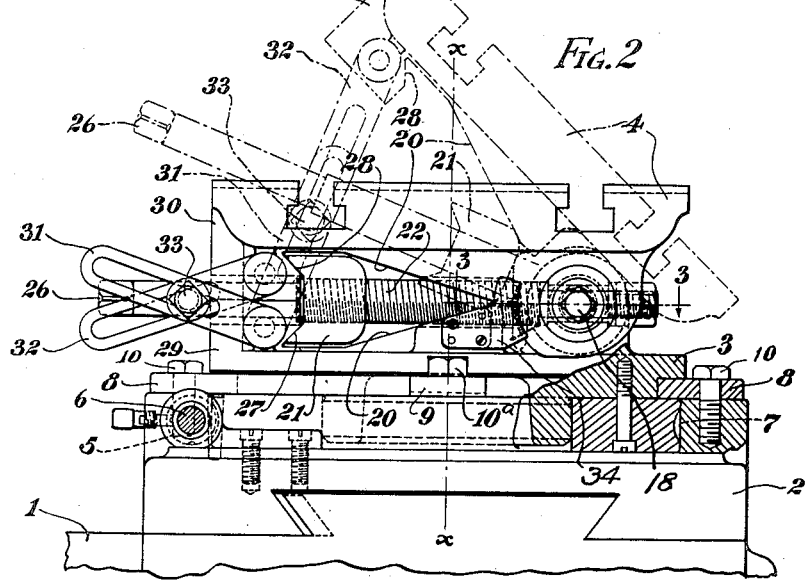
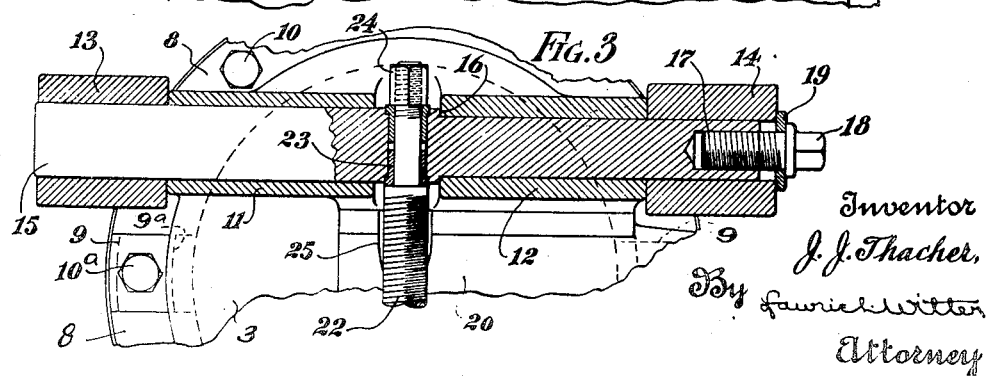
Inventor
J. J. Thacher,
By Laurie Witter
Attorney Patented Dec. 30, 1924.

1,521,341

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

WORK SUPPORT.

Application filed March 21, 1922. Serial No. 545,583.

*To all whom it may concern:*

Be it known that I, JOHN J. THACHER, a citizen of the United States, residing at Wethersfield, in the county of Hartford and State of Connecticut, have invented certain new and useful Improvements in Work Supports, of which the following is a specification.

This invention relates to work supports and more especially to an attachment comprising a base and a work holder thereon adjustable about a pivot to a desired angle, the device being particularly adapted for use on a milling or die sinking machine. The primary object of the invention is to provide such a mechanism and improved means for adjusting and securing the same in different oblique positions.

It is an object of the invention to provide a pivotally mounted work holder, means for adjusting the work holder about its pivot and clamping means both at the pivot axis and at the free end of the work holder for securing the latter in its adjusted positions.

More especially, it is an object of the invention to provide an attachment comprising a rotatably adjustable base and a work holder pivotally mounted thereon in combination with a wedging element and cooperating mechanism between the base and work holder for adjusting the latter about its pivot, other means also being provided in connection with the device for securing the work holder in its adjusted position.

A further object of the invention is to provide a universally adjustable work support comprising a base adjustable about a vertical axis and having pivotally mounted thereon a work holder normally in a horizontal position, and means between the base and work holder operative to either adjust the work holder about its pivot or to clamp the same in its horizontal position on the base.

With the above and other objects in view, my invention consists in the features of construction and operation set forth in the following specification and illustrated in the accompanying drawing. In such drawing annexed hereto and forming a part of this specification, I have shown one embodiment of my invention but it will be understood that the invention can be otherwise embodied and that the drawing is not to be construed as defining or limiting the scope of the invention, the claims appended to this specification being relied upon for that purpose.

Referring to the figures of the drawing:

Figure 1 is a front elevation of the work support mounted on a work table.

Fig. 2 is a side view thereof.

Fig. 3 is a fragmentary plan view partially in section through the work holder pivot on line 3—3 of Fig. 2.

While the work support comprising this invention may be used in connection with any metal working machine, such as milling, drilling, etc., the same is particularly adapted for use on a die sinking machine. The usual form of die sinking machine comprises a work support and a vertical tool spindle mounted on a column over the work support, the tool spindle being adapted to carry an end milling tool at its lower end. Dies of various and peculiar shapes are required to be cut on such a machine and to do this with accuracy and facility, in a machine of the type stated, necessitates the adjustment of the work to various positions relative to the tool. The work holder of the present invention is universally adjustable about vertical and horizontal axes for the purpose of so properly presenting the work to the tool. The work support is also constructed in an improved manner and operated by improved mechanism combined therewith to provide a support particularly adapted to perform the functions stated.

Referring more specifically to the drawing by reference characters, 1 indicates the base of a machine tool on which is slidably mounted a work table 2. The improved work support comprises a base 3 and a work holder 4 pivotally mounted thereon. The work support is mounted on the table for rotary adjustment about a vertical axis $x$—$x$ by means of a worm 5 on a shaft 6 engaging a worm gear 7 bolted to the under side of the base 3. Plates 8 and 9 secured by bolts 10 and 10$^a$ are provided for mounting the base 3 on the table. The two semi-circular plates 8 are diametrically opposite and when secured by tightening the bolts 10, these plates hold the base 3 in place in a manner permitting rotation thereof. The two diametrically opposite plates 9 are slightly undercut at 9$^a$ whereby when the bolts 10$^a$ are tightened these plates are forced against the worm gear 7 in a manner preventing rotation or looseness of the base 3.

The base 3 is provided with two parallel ears 11 and 12 and the work holder 4 has two parallel ears 13 and 14 adapted to be aligned with the ears 11 and 12, as shown in Fig. 3. A pivot bolt 15 extends through all such ears to pivotally secure the work holder to the base. It will be noted that the pivot bolt is of two diameters whereby is formed an annular shoulder 16 thereon. The smaller end of the bolt fits within the ears 12 and 14 and the shoulder 16 abuts against the inner end of the ear 12. This smaller end of the bolt has a threaded bore 17 into which is threaded a clamping bolt 18 over a clamping collar 19 engaging the outer end of the ear 14. Tightening of the bolt 18 serves to draw ears 12 and 14 into clamping engagement and clamp the work holder against movement about the pivot.

The opposed inner portions of the base 3 and holder 4 are provided with opposed inclined surfaces 20 between which a wedging element 21 is adapted to operate. A screw 22 to which the element 21 is threaded has one end anchored at the pivot center of the work holder and base. As illustrated in Fig. 3, this end of the screw is journaled in a two-part bushing 23 in the pivot bolt between the ears 11 and 12. A nut 24 secures the screw to the bushing and the inclined surfaces 20 are cut away at 25 to provide clearance for the screw 22. The free end of the screw is squared at 26 whereby the same may be rotated to move the wedge nut 21 therealong. It will be understood that forward rotation of the screw moves the wedge nut up the inclined surfaces and tilts the work holder, as illustrated in dot and dash lines in Fig. 2.

The rear end of nut 21 is recessed to provide two inclined surfaces adapted to cooperate with like surfaces 27 and 28 respectively on portions 29 and 30 of base 3 and work holder 4. With the portions in the position illustrated in full lines in Fig. 2, the nut is in engagement with the inclined surfaces 27 and 28 and securely holds the work holder 4 down firmly in engagement with its base 3. As stated above, the work holder may be clamped in its adjusted position by means of the pivot clamping bolt 18. For the purpose of steadying the work holder and assisting in the holding the same in its adjusted position, I provide supplemental securing means therefor. At each side of the downwardly projecting portion 30 on the free end of the work holder 4, I provide a slotted link 32. At each side of the upwardly projecting portion 29 of the base, I provide a slotted link 31. The slotted ends of each pair of these links are connected together by means of a bolt 33.

When it is desired to adjust the work holder, the clamping bolts 18 and 33 are loosened. Rotation of the screw 22 in one direction will move the wedge nut 21 forwardly between the inclined surfaces 20 and raise the holder about its pivot bolt 15. The base 3 has an indexed plate 34 thereon cooperating with a zero index mark on the work holder whereby the amount of adjustment may be accurately observed. When properly adjusted the clamping screw 18 is tightened to secure the work holder in such adjusted position. The links 31 and 32 are preferably arranged in the straight line position illustrated in dot and dash lines in Fig. 2 and the bolt 33 is tightened. The screw 22 is preferably thereafter given a slight forward movement to place the links 31 and 32 under tension, thereby taking up any lost motion or looseness. In such manner the links cooperate with the nut 21 and clamping screw 18 to rigidly secure the work holder in adjusted position against any vibration or chatter. When seated to the position shown in full lines in Fig. 2, the nut 21 engages the inclined surfaces 27 and 28 and holds the work holder 4 secured to the base 3. It should furthermore be noted that by means of the adjustment of the work holder about its horizontal pivot 15 and the adjustment of the base about the vertical axis x—x, the work holder 4 is universally adjustable to any desired position.

What I claim is:

1. A work support comprising in combination, a base, a work holder, a horizontal pivotal connection between the base and holder at one side of the latter, means anchored at the said pivotal connection and extending between the base and holder for adjusting the latter about the pivot, and means for securing the holder in its adjusted position.

2. A work support comprising in combination, a base, a work holder, a horizontal pivotal connection between the base and holder at one side of the latter, screw threaded means anchored at the said pivotal connection and extending between the base and holder for adjusting the latter about the pivot, and means for securing the holder in its adjusted position.

3. A work support comprising the combination of a base, a work holder pivotally mounted thereon, a wedging element between the base and work holder, means for moving the element longitudinally to adjust the work holder about its pivot, and other means for securing the holder in its adjusted position.

4. A work support comprising the combination of a base, a work holder pivotally mounted thereon, a wedging element between the base and work holder, means comprising a screw threaded rod anchored at the pivotal center of the work holder for moving the element longitudinally to adjust the work holder about its pivot, and other means for securing the holder in its adjusted position.

5. A work support comprising the combination of a base, a work holder thereon, a bolt pivotally connecting the base and holder, a screw threaded rod rotatably journaled in the pivot bolt, a wedge nut on the rod between the base and work holder, rotation of the rod being adapted to move the nut longitudinally and wedge the holder away from the base about the pivot, and means for securing the holder in its adjusted position.

6. A work support comprising the combination of a base, a work holder pivotally mounted thereon, one of such elements being provided with a longitudinally extending inclined surface, an element movable along the said inclined surface between the base and work holder, and means for so moving the element to adjust the holder about its pivot.

7. A work support comprising the combination of a base, a work holder pivotally mounted thereon, the base and holder being provided with opposed relatively inclined surfaces, an element movable along the said inclined surfaces between the base and work holder, and means for so moving the element to adjust the holder about its pivot.

8. A work support comprising in combination, a base, a work holder, a horizontal pivotal connection between the base and holder at one side of the latter, the base and holder being provided with opposed relatively inclined surfaces, an element movable along said inclined surfaces between the base and work holder, and a screw threadedly engaging the element for moving the same along the inclined surfaces to adjust the holder about its pivot.

9. A work support comprising in combination, a base, a work holder, a horizontal pivotal connection between the base and holder at one side of the latter, the base and holder being provided with opposed relatively inclined surfaces, an element movable along said inclined surfaces between the base and work holder, and a screw anchored at the pivot axis and threadedly engaging the element for moving the same along the inclined surfaces to adjust the holder about its pivot, the said screw being adapted to occupy a position midway between the base and holder in all adjusted positions of the latter.

10. A work support comprising the combination of a base, a work holder pivotally mounted thereon, means for adjusting the work holder about its pivot, means at the pivot for clamping the holder in its adjusted position, and means remote from the pivot and cooperating with the base and work holder for supplementally supporting the latter in its adjusted position.

11. A work support comprising the combination of a base, a work holder pivotally mounted thereon, means for adjusting the work holder about its pivot, means at the pivot for clamping the holder in adjusted position, and adjustable securing means comprising a pair of links having the cooperating elements thereof respectively connected to the base and the free end of the holder, such means being adapted to assist in supporting the work holder in its adjusted position.

12. A work support comprising the combination of a base, a work holder pivotally mounted thereon, a wedging element between the base and work holder, means for moving the element longitudinally to adjust the work holder about its pivot, means for clamping the support in adjusted position, and means remote from the pivot and comprising a pair of inter-engaging slotted links secured to the work holder and base adjacent opposite sides thereof for assisting the said clamping means to secure the work holder in its adjusted position.

13. A work support comprising in combination, a bas, a work holder, a horizontal pivotal connection between the base and holder at one side of the latter, cooperating stops located respectively on the base and holder at the side of the latter opposite the pivotal connection and adapted to support the holder in a normal horizontal position, and means for clamping the holder to firmly secure it in the said normal position.

14. A work support comprising in combination, a base, a work holder, a horizontal pivotal connection between the base and holder at one side of the latter, cooperating stops located respectively on the base and holder at the side of the latter opposite the pivotal connection and adapted to support the holder in a normal horizontal position, and means comprising an element adapted to engage opposed inclined surfaces on the base and work holder to firmly secure the latter in its said normal position.

15. A work support comprising in combination, a base, a work holder, a horizontal pivotal connection between the base and holder at one side of the latter, cooperating stops located respectively on the base and holder at the side of the latter opposite the pivotal connection and adapted to support the holder in a normal horizontal position, and means comprising an element adapted by movement in one direction to adjust the work holder about its pivot and by movement in another direction to firmly secure the holder in its said normal position.

16. A work support comprising the combination of a base, a work holder pivotally mounted thereon, an element directly between the base and work holder, movement of the element being adapted to either adjust the work holder about its pivot or to secure the work holder against such adjustment, and means for moving the element.

17. A work support comprising the combination of a base, a work holder pivotally mounted thereon, an element between the base and work holder, movement of the element in one direction being adapted to adjust the work holder about its pivot and movement thereof in another direction being adapted to secure the work holder against such adjustment, and means for moving the element.

18. A work support comprising the combination of a base, a work holder pivotally mounted thereon, an element between the base and work holder, movement of the element in one direction being adapted to wedge the work holder about its pivot away from the base and movement thereof in the opposite direction being adapted to bind the work holder against movement on the base, and a screw for moving the element.

19. A work support comprising the combination of a base, a work holder pivotally mounted thereon, one of such elements being provided with a longitudinally extending inclined surface, a screw between the base and holder, a nut on the screw, forward movement of the screw being adapted to engage the nut with the inclined surface to move the holder about its pivot away from the base, the base and holder also being provided with relatively inclined surfaces adapted to be engaged by the nut upon rearward movement thereof to securely bind the work holder and base against relative movement, and means for securing the work holder in its adjusted position.

20. A work support comprising the combination of a base, a work holder pivotally mounted thereon, a screw mounted for rotation at the pivotal center of the work holder, a nut on the screw between the base and the work holder, the base and work holder having relatively inclined surfaces adapted to be engaged by the nut upon forward movement thereof to move the work holder about its pivot away from the base, the base and work holder also being provided with relatively inclined surfaces adapted to be engaged by the nut upon rearward movement thereof to securely bind the work holder and base against relative movement, and means for securing the work holder in its adjusted position.

21. A work support comprising in combination, a base adjustable about a vertical axis, a work holder thereon, a horizontal pivotal connection between the base and holder at one side of the latter, means directly between the base and holder for raising the other side of the holder to adjust the same about the said pivotal connection, and means for securing the holder in its adjusted position.

22. A work support comprising in combination, a base adjustable about a vertical axis, a work holder thereon, a horizontal pivotal connection between the base and holder at one side of the vertical axis, a nut movable between the base and holder, the nut, base and holder having cooperating relatively inclined surfaces adapted to adjust the holder about the said pivotal connection as the nut is moved, and a screw for moving the nut.

23. A work support comprising the combination of a base adjustable about a vertical axis, a work holder mounted thereon for adjustment about a horizontal pivot, means operative by movement in one direction to secure the work holder in a horizontal position on the base and by movement in another direction to adjust the same about the pivot to a desired angular position, and means for securing the holder in its adjusted position.

24. A work support comprising the combination of a base adjustable about a vertical axis, a work holder mounted thereon for adjustment about a horizontal pivot, a single means movable in a rectilinear path in one direction to secure the work holder in a horizontal position on the base and movable in the opposite direction to adjust the holder about the pivot to a desired angular position, and means for securing the holder in its adjusted position.

In testimony whereof, I hereto affix my signature.

JOHN J. THACHER.